(12) United States Patent
Hijazi et al.

(10) Patent No.: US 10,461,560 B2
(45) Date of Patent: Oct. 29, 2019

(54) INFORMATION HANDLING SYSTEM EXTERNAL ADAPTER AND BATTERY SOURCE

(71) Applicant: Dell Products L.P., Round Rock, TX (US)

(72) Inventors: Mohammed K. Hijazi, Austin, TX (US); Merle J. Wood, III, Round Rock, TX (US); Matthew J. McGowan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/274,407

(22) Filed: Feb. 13, 2019

(65) Prior Publication Data

US 2019/0181651 A1    Jun. 13, 2019

Related U.S. Application Data

(62) Division of application No. 15/008,581, filed on Jan. 28, 2016, now Pat. No. 10,224,732.

(51) Int. Cl.
*H02J 7/00* (2006.01)
*H02J 7/14* (2006.01)

(52) U.S. Cl.
CPC ............ *H02J 7/007* (2013.01); *H02J 7/0042* (2013.01); *H02J 7/0013* (2013.01); *H02J 7/0047* (2013.01); *H02J 7/0054* (2013.01)

(58) Field of Classification Search
USPC ....... 320/109, 107, 114, 137, 108, 132, 134, 320/162, 101, 106, 112, 115, 124, 103, 320/135, 113, 150
See application file for complete search history.

(56) References Cited

U.S. PATENT DOCUMENTS

| | | | |
|---|---|---|---|
| 7,518,343 B2 | 4/2009 | Veselic et al. |
| 2008/0122400 A1 | 5/2008 | Kubota |
| 2008/0180057 A1 | 7/2008 | Watanabe |
| 2008/0315826 A1 | 12/2008 | Alberth |
| 2010/0244765 A1 | 9/2010 | Collopy et al. |
| 2013/0069583 A1 | 3/2013 | Lemelman et al. |
| 2013/0134923 A1 | 5/2013 | Smith et al. |
| 2013/0154551 A1 | 6/2013 | Jeansonne et al. |
| 2013/0200841 A1 | 8/2013 | Farkas et al. |
| 2014/0070774 A1 | 3/2014 | Terlizzi et al. |
| 2014/0253016 A1 | 9/2014 | Chiu |
| 2015/0015180 A1 | 1/2015 | Miller et al. |
| 2015/0269102 A1 | 9/2015 | Inha et al. |

(Continued)

*Primary Examiner* — Alexis B Pacheco
(74) *Attorney, Agent, or Firm* — Zagorin Cave LLP; Robert W. Holland

(57) ABSTRACT

A portable information handling system battery module has a self-contained housing having a battery charger, integrated rechargeable batteries and plural ports to transfer power, such as USB Type C ports having bi-directional power transfer capability. A cable couples first battery module port to a portable information handling system port to provide power to the portable information handling system and accept power from the portable information handling system. Plural additional battery modules daisy chain to the first battery module to accept power from and provide power to the portable information handling system. Power transfer is coordinated with communications through the ports, such as by a USB power transfer protocol supported at the information handling system and each battery module.

12 Claims, 7 Drawing Sheets

(56) References Cited

U.S. PATENT DOCUMENTS

2016/0049818 A1    2/2016   Yao et al.
2016/0087469 A1    3/2016   Armstrong
2016/0087472 A1    3/2016   Sattinger et al.
2017/0222445 A1    8/2017   Hijazi

INFORMATION HANDLING SYSTEM EXTERNAL ADAPTER AND BATTERY SOURCE

BACKGROUND OF THE INVENTION

Field of the Invention

The present invention relates in general to the field of information handling system power management, and more particularly to an information handling system external adapter and battery source.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems come in a variety of forms to meet expected end user needs for portability, processing capability, screen size, input capability and battery life. Generally, the most portable form factor is a tablet or smartphone form factor that uses a touchscreen display as the input device. Tablet information handling systems are built into a planar housing that takes minimal space, such as might fit in a back pocket or purse. Tablet information handling systems generally are convenient to carry and use for tasks that have limited processing requirements, however, limited processing capabilities and slow inputs typically found with touchscreen keyboards tend to restrict tablet information handling system to basic e-mail and web browsing tasks. Generally, tablet information handling systems have flat battery packs that store limited power so that extended use of a system for any processing intensive task can rapidly deplete the battery charge.

Other portable information handling system form factors tend to include an integrated keyboard and a mechanical mechanism to open and close access to the keyboard and to an integrated display. A clamshell housing rotates a lid relative to a main housing with a display integrated in the lid and a keyboard integrated in the main housing. A clamshell housing configuration when opened holds the display in an elevated position for viewing by an end user and, when closed, protects the keyboard and display from damage. Convertible housing configurations go a step further by allowing the lid to rotate into a tablet configuration that exposes the display for use as a tablet. Convertible configurations sometimes rotate the lid a full 360 degrees to a tablet configuration, or alternatively rotates the display in a manner that faces the display outwards when the lid closes over top of the keyboard. Generally such portable information handling systems tend to have larger housing sizes that include larger display screens and that have room to hold more powerful processing components. Although such systems have less portability than tablet configurations, they also tend to support more processing intensive applications so that an end user can work on the go. In some instances, clamshell configurations have capabilities that approach those of desktop systems with large battery packs to provide power to run the more powerful processing components and the infrastructure that often accompanies such components, such as an integrated cooling fan.

One difficulty with portable information handling systems is that the power consumed by a system can vary widely based on the type of system and how the system is used. For example, a portable information handling system with a solid state drive (SSD) remains "on" for an end user with nearly zero power use when in an idle state by storing the operating system in persistent memory. However, that same portable information handling system might execute a processing-intensive application, such as CAD rendering, that will rapidly deplete a battery charge and even surpass the capacity of an external power adapter to provide power. For smaller-sized portable information handling systems, power is often provided through data ports, such as USB ports, that do not have capacity to fully support system operations when in a high power consumption state. Larger and more capable portable information handling systems generally come with external AC-to-DC power adapters that provide increased power transfer capabilities, however, such power adapters tend to have a larger footprint and are inconvenient to carry and use.

One solution available for end users is to carry extra batteries with the portable information handling system that extend the charge life of integrated batteries. For example, the batteries are in a package that plugs into an information handling system power or communication port to either recharge the integrated battery or provide power directly to internal components to run the system. External batteries may be included in an external power adapter for to provide power when an AC power source is not available or in a package separate from the AC power source designed specifically to provide battery power. Although external batteries provide a viable alternative to power information handling systems for extended times when external power is unavailable, they do represent another item that an end user must carry and keep charged. For an active user working on-the-go, carrying additional items is often inconvenient and difficult, especially where the items are bulky.

SUMMARY OF THE INVENTION

Therefore, a need has arisen for a system and method which provides an information handling system with external power from batteries having minimal size.

A further need exists for a system and method which charges external batteries in a coordinated manner.

In accordance with the present invention, a system and method are provided which substantially reduce the disadvantages and problems associated with previous methods and systems for interfacing external power with an information handling system. A portable information handling system is powered with an external power source having separate self-contained modules that control power transfer and generate power. A control module selectively interfaces with one or both of a battery module and an AC-to-DC adapter module that provide power to allow a user to manage the size and functionality of an external power source. Battery modules interface with each other in a daisy chain configuration to conveniently charge and discharge through a common power connector, such as a power or data port of an information handling system or an AC-to-DC adapter module.

More specifically, a portable information handling system processes information with processing components disposed in a portable housing and powered by an integrated battery. The portable information handling system receives power from an external power source through a power port, such as dedicated power connector or a serial data port that provides power transfer with a power transfer protocol. In one example embodiment, a USB 3.0 Type C serial data port provides bi-directional power transfer between the portable information handling system and an external adapter that selectively configures to couple with a self-contained battery module and/or AC-to-DC adapter module. A self-contained control module removeably coupled to the portable information handling system with a USB cable includes a USB power controller to manage power transfer with one or more power sources that removeably couple to the control module and to each other. The control module USB power controller supports management of power source modules coupled to it, such as the use of external power from an AC-to-DC adapter module to charge a battery module while also providing power to the information handling system. When multiple battery modules are simultaneously coupled to each other, charging of each battery module is managed by active communication through the USB protocol with each battery module or with a default charging protocol that charges and discharges power from the most distally connected battery module in a daisy chain configuration. End users couple power source self-contained modules based on projected power needs and size convenience.

The present invention provides a number of important technical advantages. One example of an important technical advantage is that an information handling system has external power available from both a battery source and an AC source through a common control circuit. The end user assembles a control module having the desired external power source and connects the external power source to an information handling system port, such as power port or a data port that accepts power. By selecting a single external power source module, such as either a battery module or an AC-to-DC converter module, the end user minimizes the size of the assembled external power source for a desired usage model. For example, selecting a battery source module eliminates size associated with AC-to-DC converter circuits and external AC socket wire plugs. In the event that the end user desires both capabilities be available, both the AC-to-DC converter module and the battery module are simultaneously coupled to the control module. This allows the use of external AC power to both power the information handling system and charge the battery module. In addition, battery power from the battery module is available to supplement external AC power during periods of heavy information handling system current draw.

Another technical advantage of the present invention is that multiple external battery modules and/or assembled battery and control modules may be charged through a coordinated charge operation. The control modules communicate with each other and a power source to determine an available charge current draw and apply the charge current draw to charge external batteries through common power connections, such as a daisy chain of power or data cables interconnecting the external battery modules. By sharing battery state, charger capacity, charge rates and other information, source and sink charging devices rapidly respond to changes in power availability and information handling system power needs to maintain power devices in optimal configurations that support the portability of information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Portable information handling system power from an external source is managed through self-contained removeably coupled battery and AC-to-DC modules by a control module having logic to allocate power between the information handling system and plural battery modules. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
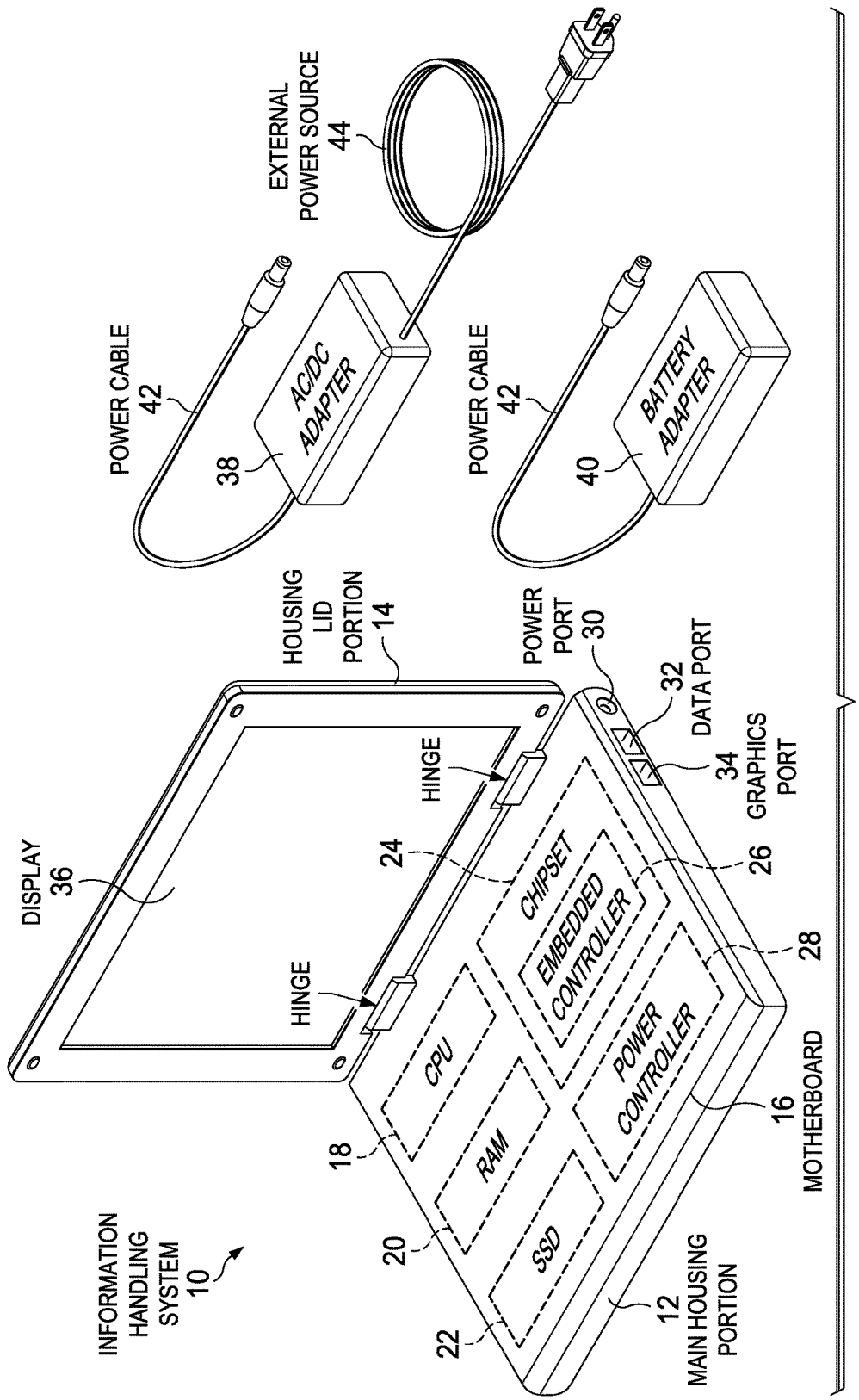
FIG. 1 depicts a blown-up view of a portable information handling system configured to accept external power from an AC adapter or a battery source.

Referring now to FIG. 1, a blown-up view depicts a portable information handling system 10 configured to accept external power from an AC adapter or a battery source. Information handling system 10 is built in a portable housing having a main portion 12 that houses processing components and a rotationally-coupled lid portion 14 that rotates between closed and open positions. In the example embodiment, housing main portion 12 holds a motherboard 16 that interfaces processing components that process information. For example, a central processing unit (CPU) 18 executes instructions stored in random access memory (RAM) 20 and solid state drive (SSD) 22. A chipset 24 includes firmware executed on processing resources and stored in flash memory that manages interaction of physical resources of information handling system 10, such as a basic input/output system (BIOS). For example, an embedded controller 26 manages inputs detected at a keyboard and application of power in response to a power switch to bring information handling system 10 to an operational state. A power controller 28 operates under the control of embedded controller 26 to control application of power to the processing components from an internal source, such as an integrated battery, or an external source, such as an AC-to-DC adapter 38 or battery adapter 40. Chipset 24 also includes graphics resources that communicate with a display 36 to present information has visual images. In the example embodiment, portable information handling system 10 has a clamshell configuration, however, in alternative embodiments other types of housing configurations may be used, such as convertible and tablet configurations.

In the example embodiment depicted by FIG. 1, portable information handling system 10 accepts external power through a power port 30 with a power cable 42 that extends from AC-to-DC adapter 38 and/or battery adapter 40. In various alternative embodiments, data ports may also provide a cable connection for power transfer, such as a data port 32 and or graphics port 34 that communicate USB, docking station, DisplayPort or other types of data protocols. Power manager 28 coordinates power transfer from such data ports to both power the processing components and charge an integrated battery. When an external power source couples to power port 30 or data ports 32 and 34, power controller 28 communicates with the external power source to determine its type and power state, and then coordinates power transfer from the power source or, in the case of a battery adapter 40, to the power source for charging the battery. As is set forth below in greater detail, AC-to-DC adapter 38 and battery adapter 40 removeably couple to each other to form power source units configured for size and power delivery preferences of an end user.

Figure 2:
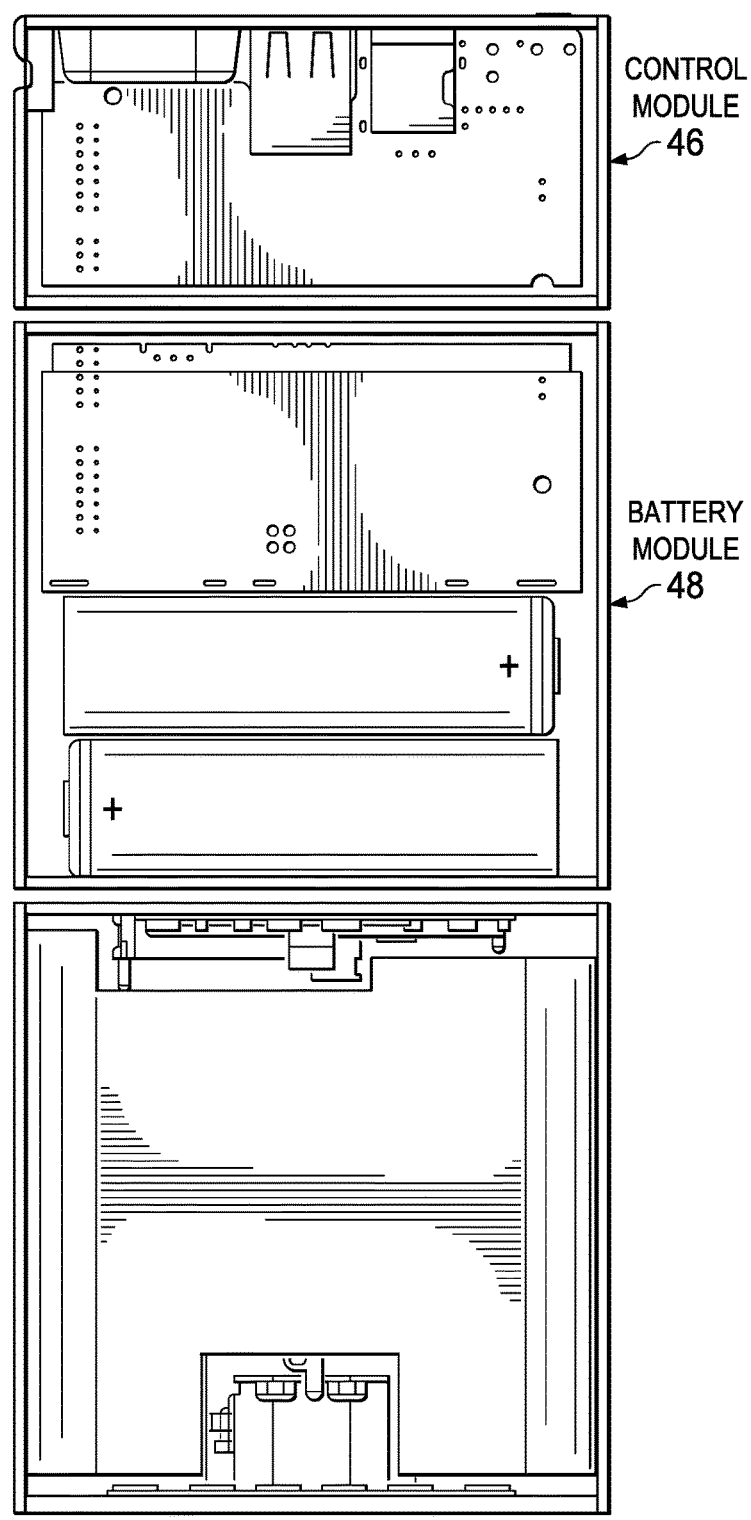
FIG. 2 depicts a modular external power source that provides power from an AC adapter or battery power source.

Referring now to FIG. 2, a modular external power source is depicted that provides power from an AC adapter or battery power source. In the example embodiment of FIG. 2, three self-contained modules couple to each other to form a contiguous unit that converts AC power to DC power and stores DC power in integrated batteries. A control module 46 includes the logic that interfaces with an information handling system 10 through a power or data cable to coordinate power transfer. Control module 46 includes one or more power and/or data ports that accept a power and/or data cable for transfer of power with an information handling system. A battery module 48 removeably couples to control module 46 and stores power in integrated batteries for transfer to information handling system 10. An AC-to-DC adapter module 50 couples to battery module 48 and converts AC power provided from an external AC power source into DC power for use to charge battery module 48 and power information handling system 10.

Figure 4:
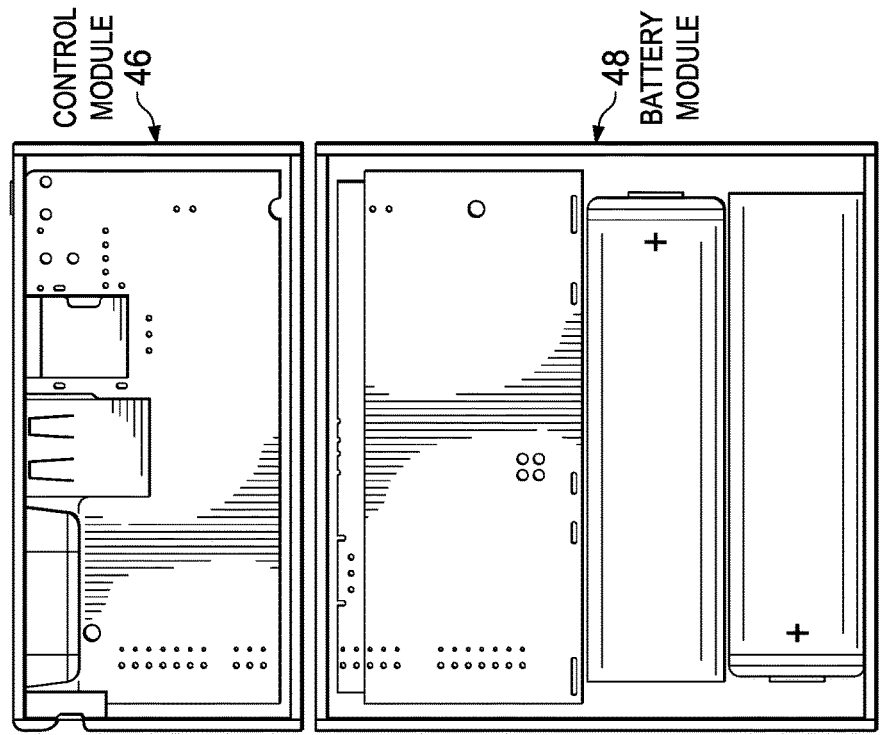
FIG. 4 depicts a modular external power source that provides power from a battery power source without an AC power source connected.
Figure 3:
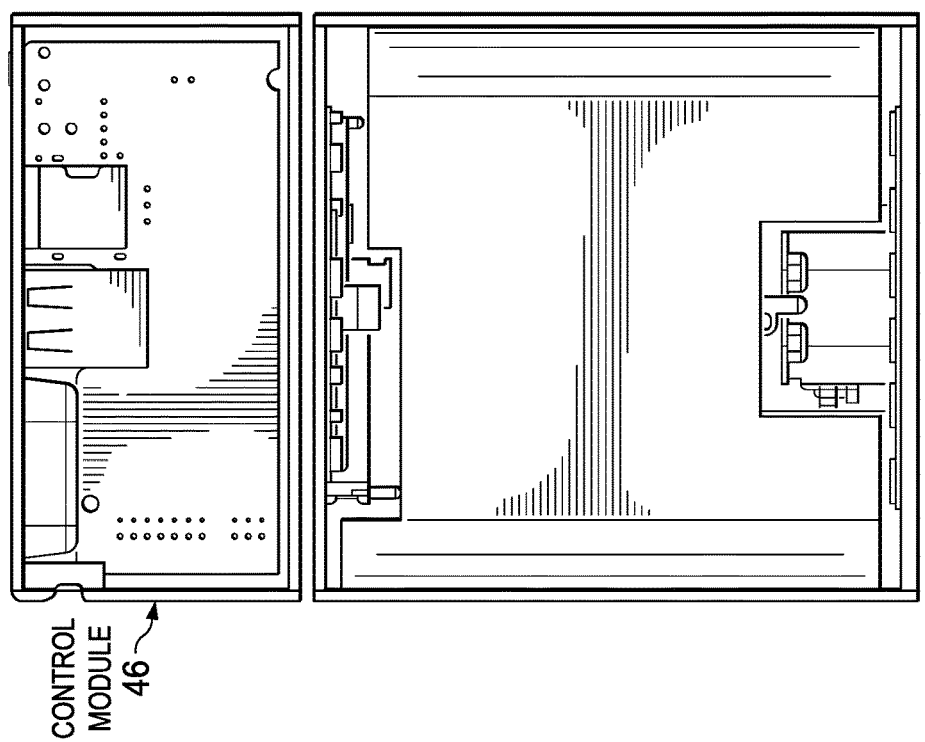
FIG. 3 depicts a modular external power source that provides power from an AC adapter without the battery power source coupled.

Referring now to FIG. 3, a modular external power source is depicted that provides power from an AC adapter 50 without the battery power source coupled. AC-to-DC adapter module 50 interacts with a removeably coupled control module 46 to send power to information handling system 10 based upon communications between control module 46 and information handling system 10. Removing battery module 48 from between control module 46 and AC-to-DC module 50 reduces the size and weight of the assembled external power source to provide an end user with improved portability where the end user expects to have access to AC power sockets. Referring now to FIG. 4, a modular external power source is depicted that provides power from a battery power source without an AC power source connected. An end user removes AC-to-DC adapter module 50 from battery module 48 so that only battery external power is available through control module 46 to power information handling system 10. The user is able to configure the external power source to have a reduced size and weight for portability where the user expects a lack of availability of external AC power sockets. Battery module 48 is charged by coupling an AC-to-DC power module to it or by communicating power from an information handling system 10 when information handling system 10 has other external power available.

Figure 5:
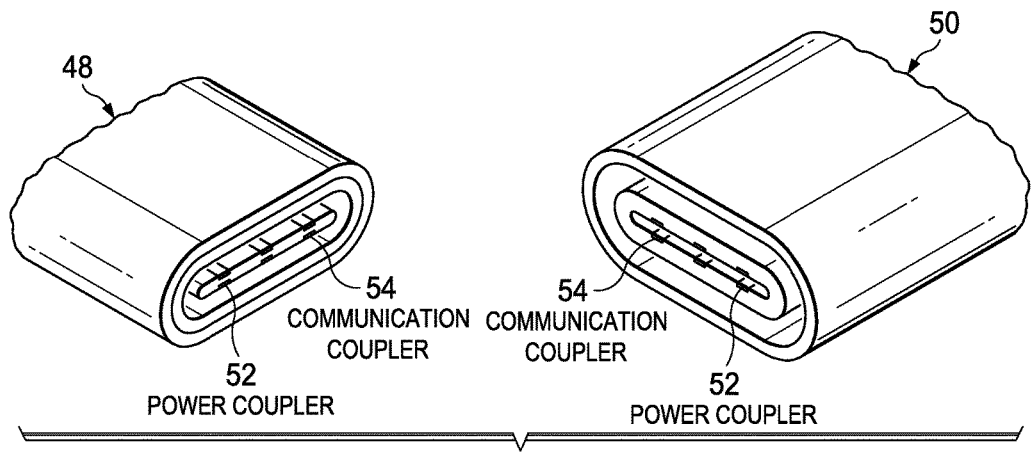
FIG. 5 depicts a side view of coupling devices aligned to communicate power and charging information between modules.

Referring now to FIG. 5, a side view depicts coupling devices 52 aligned to communicate power and charging information between modules. In the example embodiment, coupling devices 52 are symmetrically located serial data ports that include power transfer capability, such as Type C USB ports. For example, opposing male and female ports are included on each side face of battery modules 48 to provide an interface to both AC-to-DC module 50 and control module 46 when one or more battery modules are coupled between AC-to-DC module 50 and control module 46. In alternative embodiments, alternative types of connections and communication ports may be used. In one example alternative embodiment, data cables, such as USB cables may be used to couple some or all of the different modules together, including multiple battery modules 48 that receive power from one AC-to-DC adapter module 50 and/or control from control module 46. For example, USB communications including USB power protocols are exchanged between the multiple modules to provide coordinated sharing of power managed by a USB power controller disposed in control module 46. In an alternative embodiment, a USB cable connection by information handling system 10 through any one module of type 46, 48 or 50, allows a USB power controller of information handling system 10 to query each module for its capabilities and power state so that power charging and discharging is commanded from the information handling system. In such an arrangement, a control module 46 may provide similar coordination including taking over the management of charging and discharging functions in the event of a disconnect from or power down of information handling system 10.

Figure 6A:
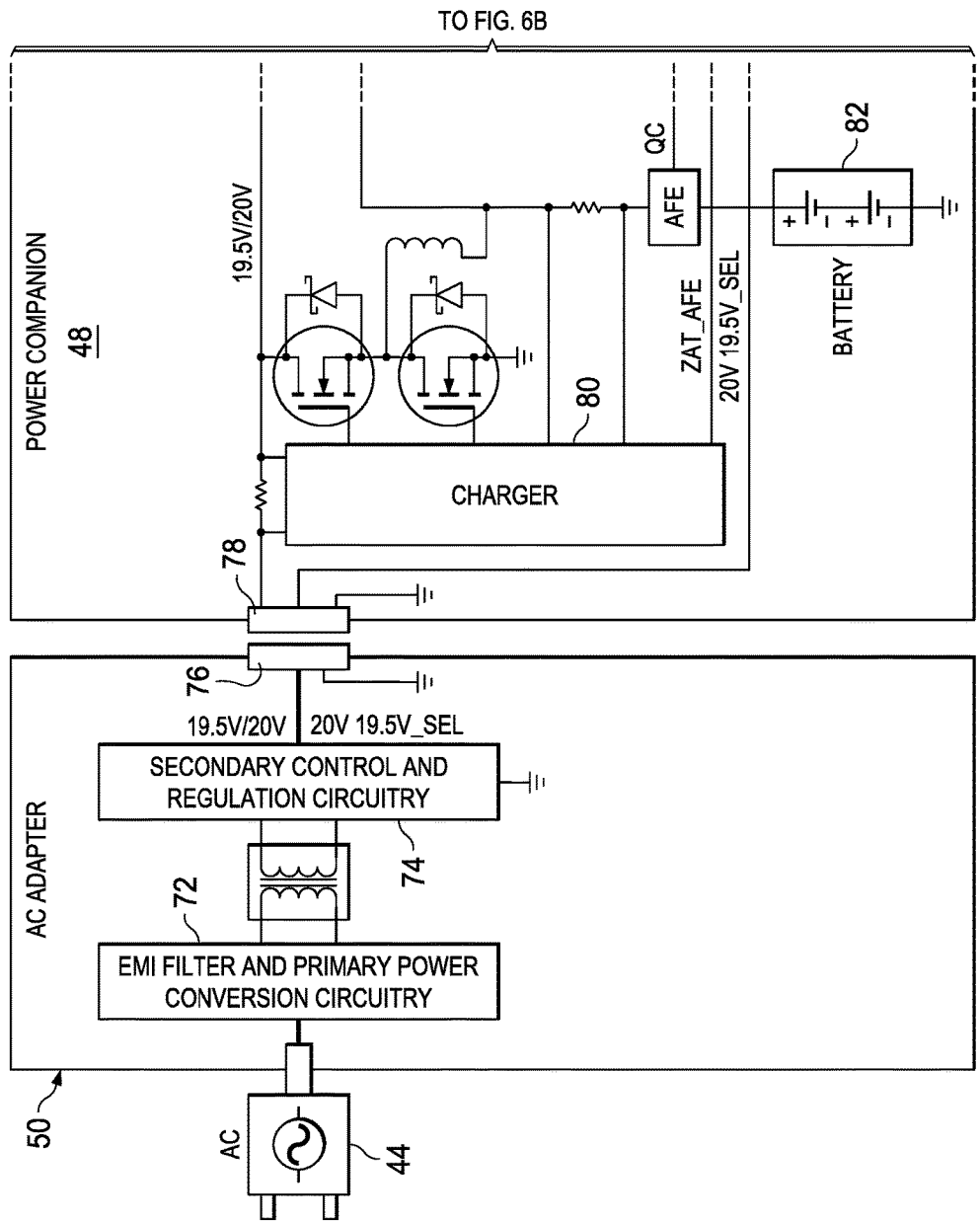
FIGS. 6A and 6B, referred to generally as FIG. 6, depict a circuit block diagram of a modular AC power source and battery power source coupled with a control module.
Figure 6B:
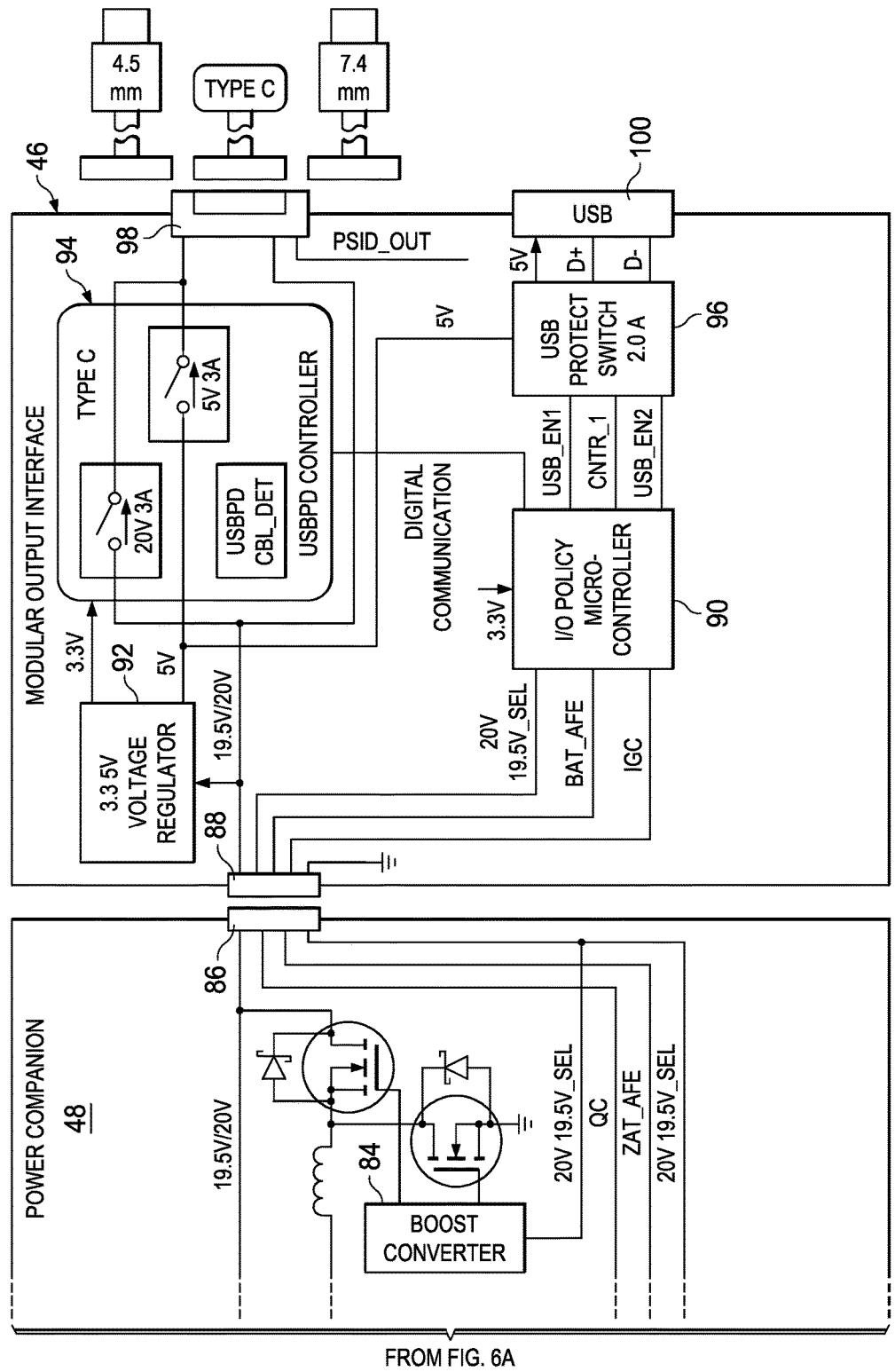

Referring now to FIG. 6, a circuit block diagram depicts a modular AC power source and battery power source coupled with a control module. In the example embodiment of FIG. 6, each module 46, 48 and 50 is in a self-contained housing separate from the other modules with all three modules selectively coupling together to form a contiguous power source device. By removeably coupling each module at a coupling point, an end user configures an external power source to have selectable size, weight and capability that matches the end user's needs. Further, in the example embodiment, the overall cost and complexity of the configurable external power source is reduced by including intelligent charging logic in only a control module 46 that manages power transfer between other modules 48 and 50 and with information handling system 10.

AC-to-DC adapter module 50 includes an external AC power source 44 that accepts AC power and communicates the AC power to a power conversion circuit 72 that converts the AC power to DC power. The DC power is provided to a voltage control regulator 74 that keeps current and voltage output within defined constraints, such as 12, 14, 19.5 or 20 VDC. A power out port 76 routes DC power out of the self-contained module 50 to interface with either a battery module 48 or a control module 46. In addition, in some embodiments, power out port 76 provides a communication path to pass commands to AC-to-DC adapter module 50, such as to voltage regulator 74 or to a USB power controller if one is included. In the example embodiment, control module 46 manages current draw from AC-to-DC adapter module 50 so that intelligence and related costs of AC-to-DC adapter 50 may be reduced.

As depicted by the example embodiment of FIG. 6, battery module 48 receives power from power out port 76 at a power in port 78 and communicates the power to a charger 80. Charger 80 applies current to charge integrated battery 82 and to send power to a boost converter 84 for communication at a power out port 86 to control module 46. In the example embodiment, the intelligence and related cost of battery module 48 is reduced by managing power transfer and charging functions from control module 46. For example, current and voltage capabilities of AC-to-DC adapter module 50 and battery module 48 are set at USB3.0 standard values, and the standard values are indicated to control module 46. Battery module 48 draws current based upon USB3.0 limits and allocates the current to output at port 86 or charge battery 82 so that current limits are not violated. If intelligence is included in AC-to-DC module 50 and battery module 48, then communication between ports 76 and 78 of the acceptable power constraints provides flexibility to connect modules together that have different power capabilities with the differences programmatically resolved.

Control module 46 accepts power from port 86 to power a voltage regulator 92 that supports operation of a USB power controller 94 to manage power transfer. USB controller 94 interfaces with an information handling system to exchange power transfer parameters that area applied to manage power transfer from battery module 48 and AC-to-DC module 50. For example, USB controller 94 handshakes through a Type C port 98 with an information handling system power controller to communicate the power transfer capabilities of AC-to-DC adapter 50 and battery module 48. These power transfer capabilities are stored and tracked with a microcontroller 90 that communicates through port 98 or through a USB2 port 100. Additional power out ports may be included at control module 46 with outputs set to match the output port connector, such as 4.5 or 7.4 mm connectors that output 65 and 90 W respectively.

In operation, a user may selectively couple the modules together to use the AC-to-DC adapter and control module 46 as a unit, to use the battery module 48 and control module 46 as a unit, and use all three modules as a unit as is depicted in FIG. 6. A user has an option to select modules to meet the user's needs. In the example embodiment, overall cost of the external power source system is reduced by leveraging intelligence in control module 46 to manage battery module 48 and AC-to-DC adapter 50 separately or as a combined unit. In various embodiments, charging of battery module 48 may be performed by AC-to-DC adapter 50 without control module 50 or in combination with charging of an information handling system battery. Further, an information handling system may charge battery module 48 by providing current through control module 46 when the information handling system has an external power source. In an example embodiment where an assembled external power unit has both AC power conversion and battery power available, control module 46 may selectively configure output that exceeds the capability of the AC-to-DC adapter module by supplementing current out with current provided from battery module 48. Coordination of power transfer parameters depends upon control module 46 having accurate information about the capabilities of the AC-to-DC adapter and battery modules that it controls.

Figure 7:
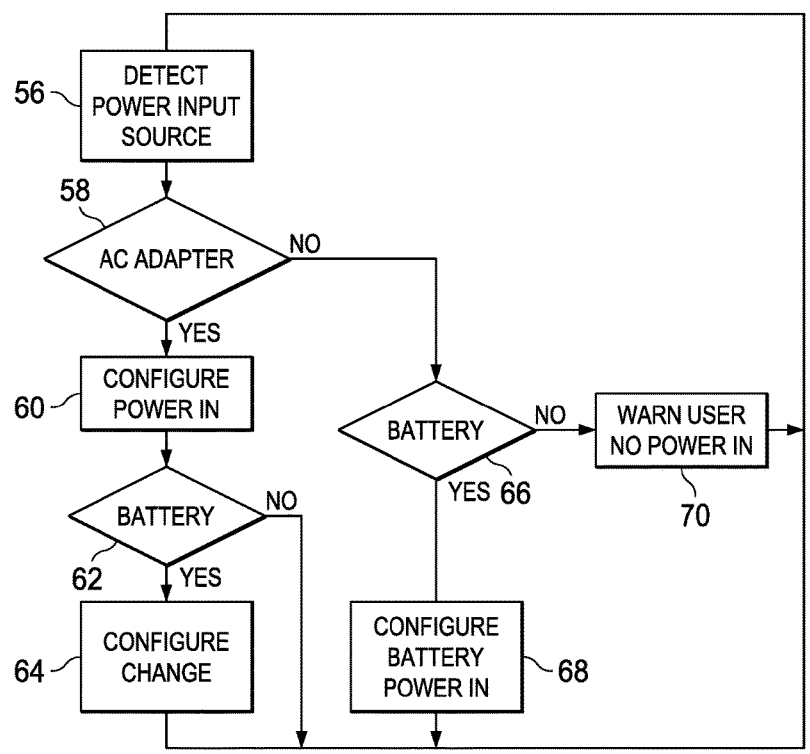
FIG. 7 depicts a flow diagram of a process for configuring power modules to interact with an information handling system and with each other.

Referring now to FIG. 7, a flow diagram depicts a process for configuring power modules to interact with an information handling system and with each other. The process starts at step 56 with detection of a power input source coupled to an information handling system. At step 56, a determination is made of whether the input power source has an AC adapter capability. If an AC adapter is present, the process continues to step 60 configure the information handling system to accept power in configured based upon the availability of the AC adapter. For example, if the external power source is coupled through USB Type C ports, standardized USB power parameters may be applied. Alternatively, power parameters may be individualized based upon USB communications. At step 62, a determination is made of whether the external power source includes a battery. If so, the process continues to step 64 to configure for the presence of a combined battery and AC-to-DC module. For example, if a battery is present and AC power is not available, charging from the information handling system to the battery may be coordinated in the event that external power is present at the information handling system from a different source. Once the information handling system and control module are configured, the process returns to step 56 monitor for a change in the power input source configuration.

If at step 58 an AC adapter module is not detected, the process continues to step 66 to determine if a battery module is present to provide power. If no battery module and hence no external power is available, the process issues a warning at step 70 to the user that no power is available and returns to step 56. If a battery is detected at step 66, the process continues to step 68 to configure the control module and information handling system to have battery power in as the external power source. For example, the information handling system is configured to charge the battery module when power is available and to select other power sources that have AC power available if multiple power sources are available. The process then returns to step 56 to continue monitoring for changes in external power source configuration.

Figure 8:
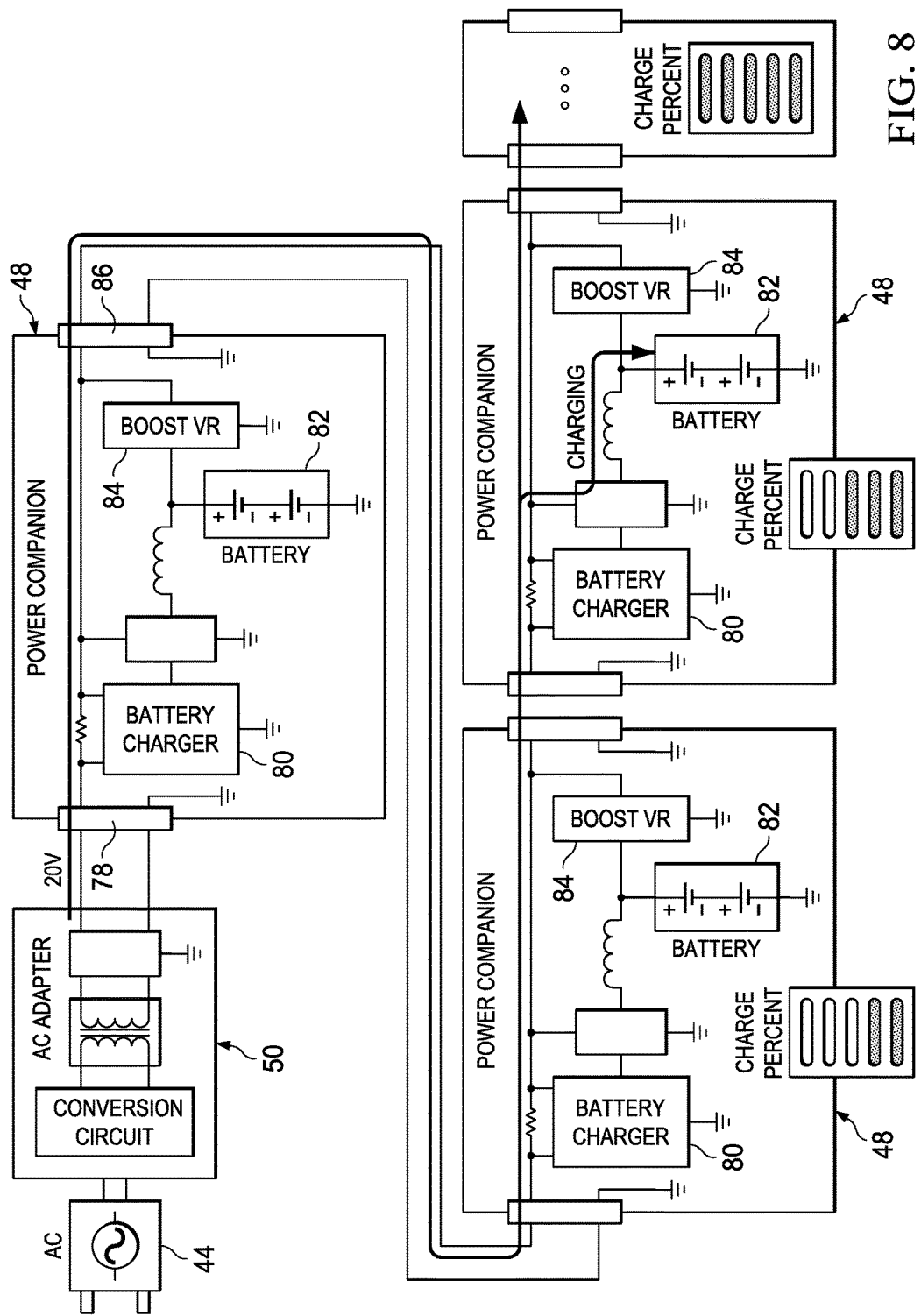
FIG. 8 depicts a circuit block diagram of power modules configured to couple with each other for cooperative charging.

Referring now to FIG. 8, a circuit block diagram depicts power modules configured to couple with each other for cooperative charging. In the example embodiment, an external AC power source connector 44 provides AC power to an AC-to-DC adapter module 50 that converts AC power into DC power to charge plural battery modules 48 coupled to each other in a daisy chain configuration. The example embodiment minimizes cost by automatically providing charging to the plural battery modules 48 without a control module 46. For example, each battery module 48 has a port for power in that couples with AC-to-DC adapter module 50 and a port for power out that couples to an information handling system power in port. A battery charger 80 accepts power in to charge a battery 82 and a boost voltage regulator 84 outputs DC power at an appropriate voltage out, such as at a voltage that matches the voltage out of AC-to-DC adapter module 50. With multiple battery modules 48, the furthest battery module 48 having less than a full charge will get first charged by DC power from AC-to-DC adapter module 50. As each battery module 48 gets charged, the next closest battery module 48 in the daisy chain relative to AC-to-DC adapter module 50 is charged until all battery modules are charged.

As an example with the daisy chain configuration of FIG. 8, AC-to-DC adapter module 50 outputs DC voltage and current compliant with USB3.0 at a Type C USB connector that couples to a first battery module 48. Similarly, each battery daisy chain coupling port is supported through as USB Type C connector. The Type C connectors may use a male configuration for power out and a female configuration for power in, or vice versa, or may have all connectors of the same male or female type. USB compliant power output is assumed at each battery module 48 so that the current draw will not exceed the capability of AC-to-DC adapter module 50. Alternatively or additionally, battery chargers 80 monitor for voltage droop to restrict current draw. Each battery charger 80 prioritizes current draw out over charging of its integrated battery 82 so that the last battery charger 80 in the daisy chain that has an uncharged battery 82 will draw current to charge its battery. In one embodiment, chargers 80 divert all current into the battery module 48 out to the next battery module 48 while voltage levels indicate a constant current charging mode. Once a battery module 48 battery charger 80 detects that current draw out has reached a constant voltage charging mode, the battery charger 80 may either divert excess current to charge its integrated battery 82 or may cut off current out so that all current into a battery module 48 is applied to charge the integrated battery 82. In such an embodiment, once the battery module 48 that is closest to AC-to-DC adapter module 50 reaches constant voltage charging, its charger 80 provides current out so that all battery modules 48 in the daisy chain receive current to support constant voltage charging. Advantageously, delaying constant voltage charging for all battery modules 48 provides a rapid base charge buildup in each battery module 48 with the full current output of AC-to-DC adapter module 50 used until none of the batteries in the daisy chain can accept the full current output as a collective unit.

In alternative embodiments, charging of battery modules 48 in a daisy chain configuration may be managed by a control module 46 or an information handling system 10 that includes a USB power controller to communicate charge parameters. In one embodiment, each battery module 48 provides its power state to the USB power controller so that a centralized charger management is provided. Power state information and charge parameters are passed through the daisy chain interface between each battery module 48 to the control module 46 or information handling system 10. The daisy chain interface may be establish by coupling each battery module to its proximate module with a direct port to port connection or by coupling some or all of the modules to each other with cables, such as USB cables. In some embodiments, communication with and control of battery modules 48 and AC-to-DC modules 50 is provided by a USB power controller integrated in each module. In this manner, the order of charging may be modified by having a control module or information handling system command the order in which battery modules in the daisy chain are charged independent of their physical order.

Although the present invention has been described in detail, it should be understood that various changes, substitutions and alterations can be made hereto without departing from the spirit and scope of the invention as defined by the appended claims.

What is claimed is:

1. A method for powering a portable information handling system, the method comprising:
    removeably coupling a power-in port of a first battery module to a charging port of power source with a first cable;
    removeably coupling a power-out port of the first battery module to a power-in port of a second battery module with a second cable;
    providing power from the power source to the first battery module through the power-in port;
    determining at the first battery module that the second battery module has capacity to accept a charge;
    charging the second battery module with power provided at the power-out port of the first battery module to the power-in port of the second battery module; and
    charging the first battery module when the second battery module a predetermined capacity to accept a charge.

2. The method of claim 1 wherein the power-in ports and power-out ports comprise identical serial data ports and the first and second data cables comprise identical serial data cables, the method further comprising:
    communicating between the power source, the first battery module and the second battery module through the serial data ports and cables to determine power states; and
    configuring the serial data ports as power-in or power-out ports based upon the power states.

3. The method of claim 2 wherein the power source comprises an information handling system having a power manager, the method further comprising:
    querying with the power manager through the serial data cables a power state of each battery module; and
    commanding with the power manager the application of power to charge each battery module.

4. The method of claim 3 wherein the serial ports comprise USB Type C ports and the serial data cables comprise USB cables.

5. The method of claim 2 wherein the power source comprises an AC-to-DC adapter module that accepts AC power and outputs DC power to a battery power-in port.

6. The method of claim 5 further comprising:
    charging only the second battery module if the second battery module charges in a constant current mode; and
    charging the first battery module at a predetermined capacity of the second battery module by determining that the second battery module has transitioned from a constant current mode to a constant voltage mode.

7. A battery module for powering a portable information handling system, the battery module comprising:
    a self-contained housing having at least two power ports configured to couple to external cables;
    a rechargeable battery disposed in the self-contained housing; and
    a battery charger interfaced with the at least two ports and the rechargeable battery, the battery charger operable to discharge power from the rechargeable battery through at least one of the ports and to charge the rechargeable battery with power received from at least one of the ports, the battery charger further operable to detect a second battery module coupled to the port that discharges power and to coordinate charging of the second battery module in cooperation with the integrated battery.

8. The battery module of claim 7 wherein the at least two power ports comprise serial data ports and the battery charger comprises a serial data charging protocol operable to communicate through the serial data ports with a power source and the second battery module to coordinate charging of the second battery module.

9. The battery module of claim 8 wherein the two power ports comprise USB Type C ports and the serial data charging protocol comprises a USB charging protocol.

10. The battery module of claim 8 wherein the battery charger is further operable to coordinate charging of plural battery modules daisy chained to a serial data port of the second battery module, the battery charger charging in an order from the most remote daisy chained battery module to the most proximate daisy chained battery module.

11. The battery module of claim 7 wherein the battery charger is configured to forward all power in to a port that accepts power out through a port that discharges power until the second battery module reaches a constant voltage charging mode.

12. The battery module of claim 7 wherein the battery charger is further configured to charge the integrated battery upon detecting constant voltage charging of the second battery module.

* * * * *